US008265243B2

(12) United States Patent
Alexander et al.

(10) Patent No.: US 8,265,243 B2
(45) Date of Patent: Sep. 11, 2012

(54) UNRESTRICTED CALLING CIRCLE FOR TELEPHONE SERVICE

(75) Inventors: Jason Alexander, Glen Ridge, NJ (US); John Karsner, Walnut Creek, CA (US); Dan Cipoletti, West Caldwell, NJ (US)

(73) Assignee: Virgin Mobile USA, LLC, Warren, NJ (US)

( * ) Notice: Subject to any disclaimer, the term of this patent is extended or adjusted under 35 U.S.C. 154(b) by 1528 days.

(21) Appl. No.: 11/560,125

(22) Filed: Nov. 15, 2006

(65) Prior Publication Data
US 2008/0112548 A1 May 15, 2008

(51) Int. Cl.
*H04N 15/00* (2006.01)
(52) U.S. Cl. .......... 379/114.06; 379/114.12; 379/121.02
(58) Field of Classification Search ............... 379/112.1, 379/114.06, 121.02, 121.04, 114.12, 114.26, 379/127.04
See application file for complete search history.

(56) References Cited

U.S. PATENT DOCUMENTS

| 5,987,107 | A | * | 11/1999 | Brown | 379/114.12 |
| 6,574,467 | B1 | * | 6/2003 | Jonsson | 455/414.1 |
| 7,751,798 | B2 | * | 7/2010 | Morhenn et al. | 455/406 |
| 2004/0013254 | A1 | * | 1/2004 | Hamberg et al. | 379/202.01 |
| 2005/0181796 | A1 | * | 8/2005 | Kumar et al. | 455/445 |

OTHER PUBLICATIONS

RCR Wireless News, Apr. 24, 2006.*
Hill, K., "T-Mobile USA Playing Favorites in Battle with Competition; What's Included, Excluded," RCR Wireless News, Oct. 9, 2006 [online] [Retrieved on Sep. 5, 2008] Retrieved from the Internet<URL:http://www.accessmylibrary.com/comsite5/bin/aml_landing_tt.pl?page=aml_article_print&i... .
La Monica, P.R., "A New Twist in the Cell Phone Price Wars," CNNMoney.com, Apr. 20, 2006, [online] [Retrieved on Sep. 5, 2008] Retrieved from the Internet<URL:http://cnnmoney.printthis.clickability.com/pt/cpt?action=cpt&title=Alltel+fires+a+shot+in+t... .
"Late News," RCR Wireless News, Apr. 24, 2006 [online] [Retrieved on Sep. 5, 2008] Retrieved from the Internet<URL:http://www.accessmylibrary.com/comsite5/bin/aml_landing_tt.pl?page=aml_article_print&i... .
"Sprint Offers an Industry First with Unlimited Mobile Calls to and From a Home or Business," Business Wire, Mar. 8, 2006, [online] [Retrieved on Sep. 5, 2008] Retrieved from the Internet<URL:http://www.accessmylibrary.com/comsite5/bin/aml_landing_tt.pl?page=aml_article_print&i... .
"Virgin Mobile USA Unlimited Nights & Weekends Cost Less Than a Can of Soda," PR Newswire Feb. 14, 2006, [online] [Retrieved on Sep. 5, 2008] Retrieved from the Internet<URL:www.accessmylibrary.com/comsite5/bin/aml_landing_tt.pl?page=aml_article_print&i... .
"Who Will Your 10 Be? SunCom Wireless Announces Mobile-to-Anyone (SM)," Business Wire, Mar. 1, 2006 [online] [Retrieved on Sep. 5, 2008] Retrieved from the Internet<URL:http://www.accessmylibrary.com/comsite5/bin/aml_landing_tt.pl?page=aml_article_print&i... .

* cited by examiner

*Primary Examiner* — Curtis Kuntz
*Assistant Examiner* — Yosef K Laekemariam
(74) *Attorney, Agent, or Firm* — Fenwick & West LLP

(57) ABSTRACT

Subscribers of a telephone service can define a calling circle, which includes a group of other telephone subscribers with whom the subscriber receives preferential billing rates. The members of the calling circle may include customers of a telephone service provider other than the subscriber's telephone service provider.

21 Claims, 2 Drawing Sheets

UNRESTRICTED CALLING CIRCLE FOR TELEPHONE SERVICE

BACKGROUND

This invention relates generally to telephone communication services, including wired and wireless telephone services, and more particularly to discounted calling groups for subscribers of such services.

Many telephone service providers—both wireless and wired service providers—have offered special "family circle" or "calling circle" plans. In a calling circle plan, a subscriber receives preferential calling rates for telephone calls to and from other members of the subscriber's calling circle. A strong motivation for calling circle plans was to provide an incentive for groups of people to subscribe to the same telephone service provider—namely, the to service provider that was offering the calling circle discount.

A significant limitation to these plans, however, was that the members of the subscriber's calling circle must all be subscribers of the same telephone service. In this way, calling circle plans encouraged new users to subscribe to a particular service while they discouraged existing subscribers from leaving. If subscribers chose the source of their telephone service differently from their family and/or friends, the subscribers' ability to receive preferential rates with their family and/or friends would be lost. The limitation that all members of the calling circle must be subscribers of the same service provider has thus been integrally tied to previous calling circle plans. If those plans did not include this restriction, the plans would be much less effective for achieving the service provider's goals.

But people's relationships, and thus their calling habits, do not naturally align with their telephone service memberships. Whereas limiting the membership of a calling circle to subscribers of the same service provider serves the interests of that service provider, it does not serve the interests of the consumer. For this reason, previous calling circle plans with their restrictions on membership have been inadequate for consumers' needs.

SUMMARY OF THE INVENTION

To meet the needs of consumers as well as telephone service providers, an unrestricted calling plan allows a subscriber to define a calling circle to include subscribers of a telephone service provider other than the subscriber's own telephone service provider. The subscriber then receives preferential billing rates for calls with the members of the subscriber's group. The preferential billing rates may be extended to other types of communications as well, such as text messaging, emails, and instant messages.

In one embodiment, a telephone service provider receives from a subscriber a selection of one or more telephone numbers for members of a calling circle. Because the calling circle plan is unrestricted, at least one of the telephone numbers is associated with a telephone service provider other than the subscriber's telephone service provider. Thereafter, as the subscriber uses the telephone service, the telephone service provider tracks the subscriber's calling activity, which includes telephone calls with one or more members of the calling circle. The telephone service provider then charges the subscriber for the calling activity. The subscriber is charged a first rate for calls with members of the calling circle and a second rate for calls between phone numbers of persons outside the calling circle, where the first rate is discounted with respect to the second rate. The telephone service provider may also charge the subscriber a service fee in exchange for receiving the discounted rate.

In embodiments of the invention, subscribers may select the members of their calling circle groups independently of their memberships in other subscribers' calling circles. In this way, a calling circle can be personal to each subscriber, where a subscriber may include another person in the subscriber's calling circle even if the subscriber is not in that person's calling circle. This allows more flexibility in the service offered and is a further relaxation of the limitations of previous calling circle plans. Moreover, because the members of a particular subscriber's calling circle need not be subscribers of the same telephone service provider, many members may not have the ability to define an unrestricted calling circle because their telephone service provider does no offer that option. The one-way nature of embodiments of the invention allows this not to be a problem.

In one embodiment of the invention, the telephone service provider may charge subscribers a service fee for the calling circle plans. The service fee may be a one-time fee or may be charged on a recurring basis, such as monthly, weekly, or daily. The service fee may also be based on the number of members that a subscriber chooses to include in the calling circle.

In another embodiment, a limit is placed on the frequency or total number of time a subscriber may change the members of the calling circle, such as by adding members. This helps to prevent fraud, wherein a subscriber could otherwise change the membership before each call to obtain preferential billing for all calls. The limit may disallow the number of changes or additions to the calling circle, or it may cause a change fee to be charged for each change or addition to the calling circle beyond a predetermined number of free changes.

These and other features, aspects, and advantages of various embodiments of the invention will become better understood with regard to the following description and accompanying drawings.

DETAILED DESCRIPTION OF THE PREFERRED EMBODIMENTS

Figure 1:
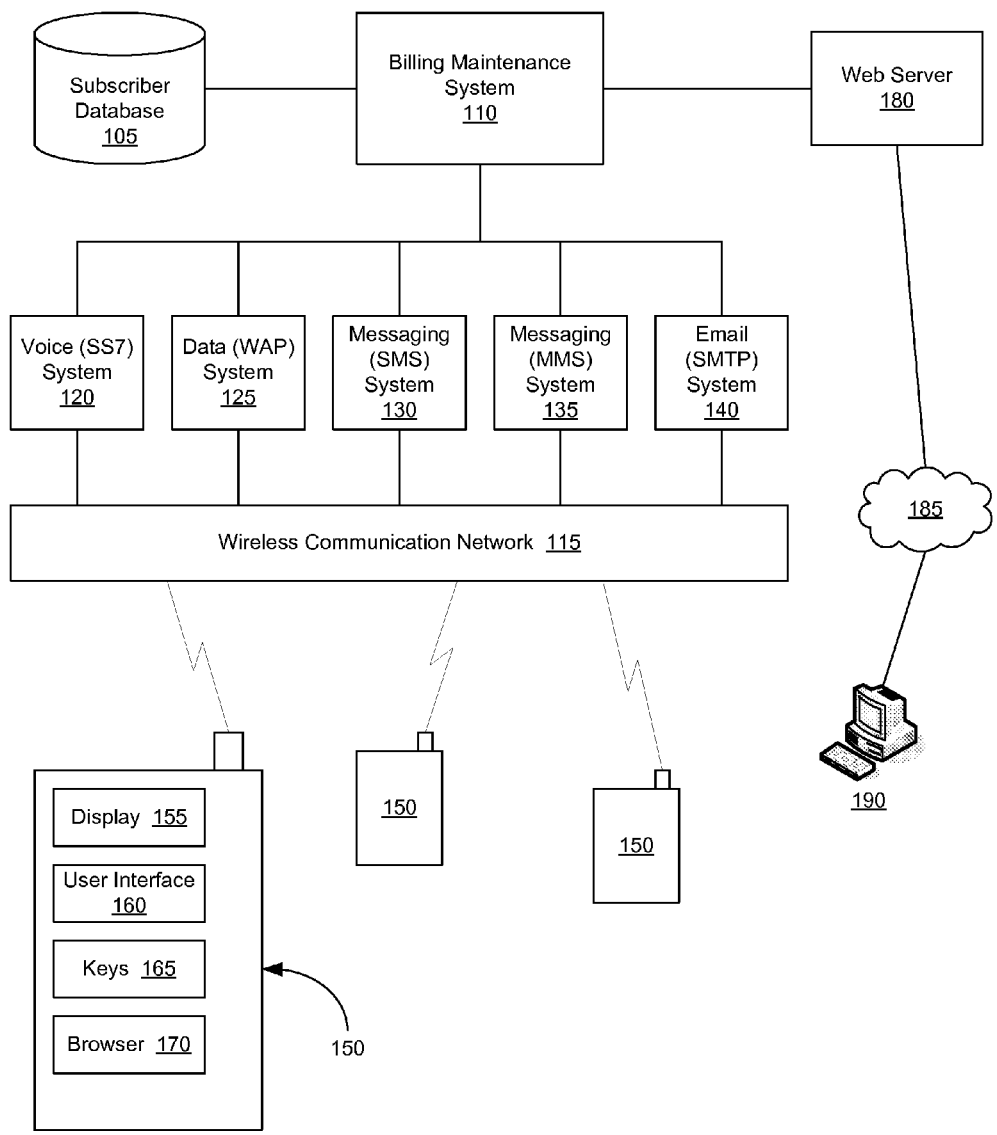
FIG. 1 is a schematic diagram of a wireless telephone services system, in accordance with an embodiment of the invention.

The unrestricted calling circle functionality described herein may be applied to many different types of telephone services, including both wired and wireless telephone services. Each of these types of telephone services may be implemented using a variety of hardware and software architectures. FIG. 1 shows one example of a wireless services system; however, embodiments of the invention are not limited to this particular architecture or combination of wireless services shown, but rather they can be applied in many other environments. Accordingly, the architecture of a wireless services system is described herein to provide a context for an implementation of various embodiments of the calling circle plan, but not to limit the applicability of those embodiments.

In a basic scenario, subscribers use their wireless mobile devices 150 to communicate with the services system via a wireless communications network 115. The wireless services system shown in FIG. 1 includes a number of subsystems that provide services for the subscribers. In this example, the subsystems include a voice system 120 to allow subscribers to make voice calls via the wireless network 115 and a data system 125 to allow subscribers to access digital information over the network 115 from their wireless devices 150. The wireless services system may further include subsystems such as a text messaging system 130, multimedia messaging system 135, and an email system 140, enabling subscribers to send various types of asynchronous messages over the network 115. These and other types of wireless services are well known.

The wireless service provider may track the subscribers' use of the services using a billing maintenance system 110. The billing maintenance system 110 typically comprises a computer system having software for managing the subscriber accounts for the wireless service. The billing maintenance system 110 is coupled to a subscriber database 105, which stores entries for the subscribers' accounts. In one illustrative example, the data associated with a subscriber's account includes a unique identification number (such as the phone number for the wireless device), a status for the subscriber's account (e.g., current, past due, suspended, or expired), an access code for validation of the subscriber, an account balance, and an optional expiration date of the account (defined below).

The billing maintenance system 110 is communicatively coupled to the services subsystems 120 through 140 to monitor their usage. In this way, the billing maintenance system 110 can record the transaction data for each subscriber in the subscriber database 105. The transaction data is an account of each subscriber's use of the services, which may for example include data such as the minutes and other details of voice calls, the amount of data sent and/or received in messages and emails, and the purchases of games or ring tones. As subscriber usage activity occurs, or periodically at other times, the billing maintenance system 110 adjusts the subscriber' account balances in the subscriber database 105 to debit the accounts for that usage as appropriate. The billing maintenance system 110 preferably also logs the usage activity in the subscriber database 105 so it can be later reported, for example, for billing or accounting purposes.

As shown in FIG. 1, the wireless devices 150 operated by the subscribers are configured to communicate wirelessly with the wireless communications network 115. Many types of wireless devices 150 exist, and other types will likely be developed in the future, but the devices 150 may comprise any products capable of communicating with the wireless network 115 described herein. This includes cellular phones, PDAs, handheld email devices, and similar devices.

In a typical embodiment, the wireless communication device 150 comprises a display 155, a user interface 160 for causing the display 155 to show content to a subscriber, and keys 165 to allow a subscriber to input controls and information. The keys 165 may include a first group of keys in the form of hard-coded keys (such as alphanumeric keys) and a second group of keys in the form of operation keys or "soft keys." In one embodiment, the wireless device 150 further includes a browser 170 (such as a WAP browser or "minibrowser") for viewing digital content encoded in a markup language.

The wireless service may be offered as a pre-paid service, in which subscribers add value to their accounts before using the network. In one example of a pre-paid service, the billing maintenance system 110 maintains the balance information for each of the subscribers, where the balance information includes an amount of value remaining in each subscriber's account. Based on pricing schemes defined by the service provider, a subscriber's usage of the network and/or other purchases associated with the subscriber's account causes a corresponding debiting of that account. The subscriber can continue to use the services while there is sufficient value in the account, after which the subscriber must add value to the account (also known as "topping up"). A variety of different payment methods may be used to replenish a pre-paid account, including, without limitation, credit or debit card payments, direct payment from a checking account, and purchase and use of a PIN. Further, an expiration date may be set for each subscriber account, after which the account becomes inactive unless the subscriber adds value to the account. This date is typically set to be several months after the last time value was added to the account, or alternatively, after the last activity charged to the account.

In the context of a pre-paid wireless services system shown in FIG. 1, and/or for other types of telephone services, a telephone service provider may offer a subscriber the ability to define a group of people in that subscriber's "calling circle." A subscriber may select members of the subscriber's calling circle in a variety of ways. For example, when the subscriber first sets up service, the subscriber may identify the members of the subscriber's calling group. This may be done over whatever communication means the subscriber uses to setup the service, such as over a telephone connection or a web site. Alternatively, after the subscriber has service, the subscriber may add the calling circle option to the subscriber's service plan. This may also be done over a variety of channels. In one example, the services provider providers a web portal, such as with web server 180, which subscribers may conveniently select the members of their calling circle groups.

Unlike previous calling circle plans, the subscriber may select as members of the subscriber's calling circle persons who are customers of a telephone service provider other than the subscriber's telephone service provider. This greatly increases the number of people who are eligible to be in the subscriber's calling circle, thereby increasing the utility of the calling circle to the subscriber. In one embodiment, the calling circle is personal to the subscriber, so that the subscriber need not be a member of another person's calling circle in order to have that person a member of the subscriber's calling circle. This removes further limits on calling circles that have plagued previous plans. Embodiments of the calling circle plans may still place limits on the number of members in a particular subscriber's calling circle, thereby preventing the subscriber from abusing the plan.

Figure 2:
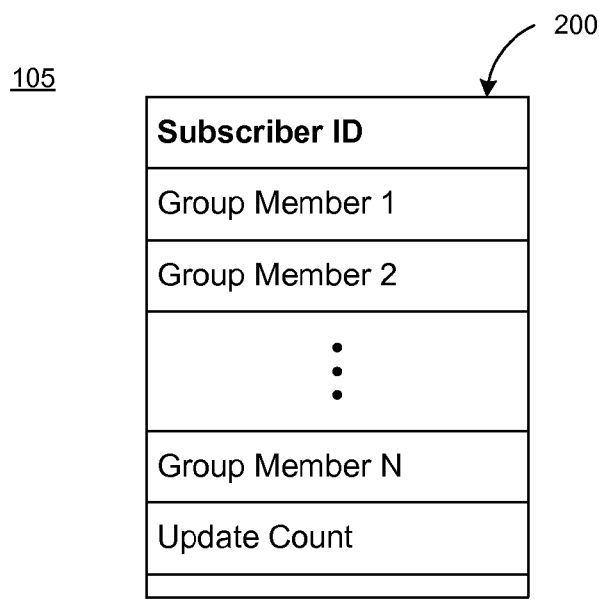
FIG. 2 is a data record for managing a subscriber's calling group, in accordance with an embodiment of the invention.

Once a subscriber chooses to have a calling circle plan and selects one or more members of the calling circle, the billing and maintenance system 110 stores this information in the subscriber database 105. FIG. 2 illustrates a sample record 200 in the subscriber database 105 for storing a subscriber's calling circle information. AS shown, the data record 200 includes an identification of the subscriber, a list of the members of the subscriber's calling circle, and a count of the number of updates or additions to the calling circle that have been made. The members in the calling circle may be identified by their phone numbers, and in this sense the "members" may include multiple people, or indeed anyone, who use the telephone number associated with the member in the record 200. The count of the number of updates is used if desired to limit the number of updates to the calling circle a subscriber may make, which is described in more detail below.

When the subscriber makes telephone calls over the network 115, the billing and maintenance system 110 tracks this calling activity. In other embodiments, the billing and maintenance system 110 may track other communication activity, such as text messages, emails, and instant messages. These telephone calls and/or other communications may be between the subscriber and one or more phone numbers of the members of the calling circle. According to the calling circle plans, the subscriber receives preferential rates for communications with the members of the calling circle. Accordingly, upon the regular billing cycle in which the bills are computed for the subscriber's use of the services, the billing and maintenance system 110 computes the appropriate charges by including the discounted rates for these qualifying communications.

Various discounted rating schemes may be used for providing preferential billing rates for calls with members of the calling circle. In one embodiment, the subscriber receives free calls with members of the subscriber's calling circle for a predefined time period (e.g., free calls for weekend days and/or nights, where nights are defined for a given time period). Many alternative discounting schemes may be used, alone, or in combination, such as free calling all the time for members of the calling circle, or a straight percentage or other flay discount from the normal rate for calls to members of the calling circle.

In one embodiment, the telephone service provider charges the subscriber in exchange for the privilege of establishing the calling circle. This allows the service provider to recoup costs and generate profits from the calling circle plans. Like the discounting, many different pricing schemes are possible for the calling circle. For example, the service provider may charge the subscriber a one-time fee for establishing the calling circle, or it may charge a recurring fee (e.g., monthly or daily) for duration of time the calling circle is in effect.

In another embodiment, the service provider may limit the subscriber's ability to modify the members of the calling circle. This could be to avoid a subscriber's taking advantage of the calling circle plan. For example, if there were no limits on a subscriber's ability to modify or add members to the calling circle, and it were easy to do so, the subscriber could add a call recipient to the calling circle group each time the subscriber places a new call to a person not already in the calling circle. This would defeat the general idea of establishing a calling circle for frequently called numbers. Accordingly, the service provider could limit the number of additions to the calling circle. This limiting may be strict, to completely disallow an modifications once a limit is reached, or it could allow modifications once the limit is reached if the subscriber agrees to pay a calling circle change fee. For example, a subscriber may be allowed to make two changes to the calling circle group per month, and after that would have to pay a fee for each additional change. By setting the fee sufficiently high, abuses of the calling circle plan could be effectively discouraged.

Figure 3:
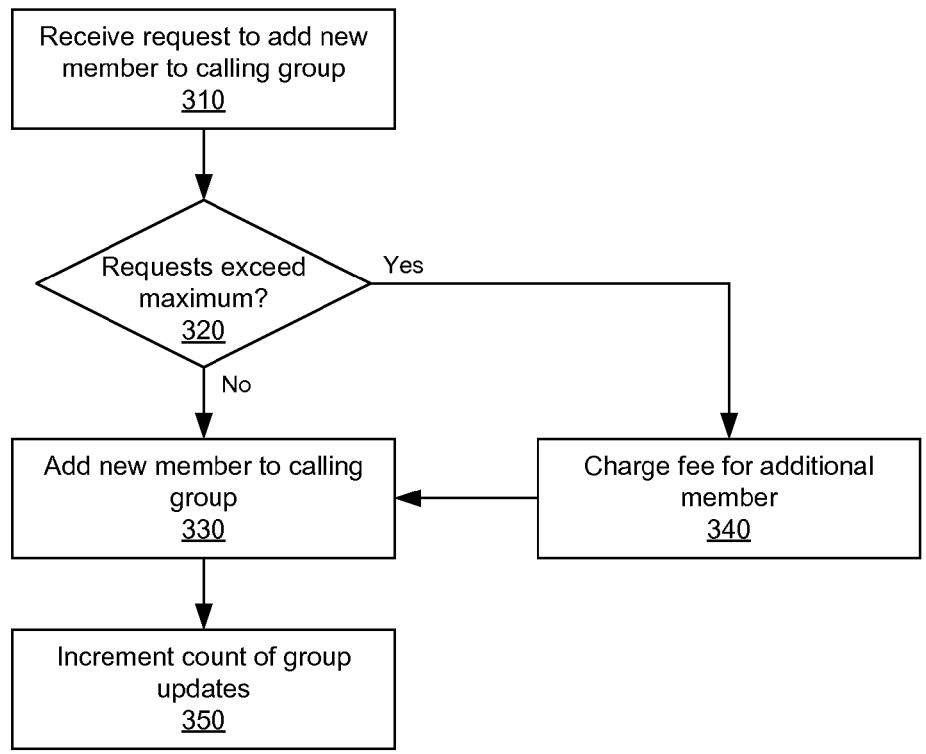
FIG. 3 is a flow diagram of a process for updating a subscriber's calling group, in accordance with one embodiment of the invention.

FIG. 3 is a flow chart of one embodiment of a process for allowing a subscriber to change the calling circle. As illustrated, the service provider receives 310 a request from the subscriber to add or otherwise modify the calling circle membership. If 320 the number of requests (as tracked, e.g., using the "update count" value in the data record 200 shown in FIG. 2) exceed a predefined maximum, the service provider charges 340 the subscriber the calling circle change fee pursuant to the agreed upon calling plan and then handles the subscriber's request. If 320 the subscriber has not exceeded this limit, the service provider handles the request without charging any fees. To handle the request, the service provider adds 330 the requested member to the subscriber's calling circle. The service provider also increments 350 the subscriber's count of update requests (see FIG. 2). This count may be periodically reset, e.g., if the subscriber is to receive a predefined number of free updates during each period.

The foregoing description of the embodiments of the invention has been presented for the purpose of illustration; it is not intended to be exhaustive or to limit the invention to the precise forms disclosed. For example, although the systems and methods described above are in the context of pre-paid wireless services, other embodiments of the invention may be applied to traditional monthly accounts or for telephone service to the home. Persons skilled in the relevant art can thus appreciate that many modifications and variations are possible in light of the above teachings. It is therefore intended that the scope of the invention be limited not by this detailed description, but rather by the claims appended hereto.

What is claimed is:

1. A method for providing telephone services to a subscriber by the subscriber's telephone service provider, the method comprising:
   receiving from a subscriber a selection of one or more telephone numbers for members of a calling circle, at least one of the telephone numbers associated with a telephone service provider other than the subscriber's telephone service provider;
   tracking calling activity by the subscriber, the calling activity including telephone calls between the subscriber and one or more phone numbers of the members of the calling circle;
   charging the subscriber a first rate for calls between phone numbers of members of the calling circle and a second rate for calls between phone numbers of persons outside the calling circle, the first rate being discounted with respect to the second rate;
   receiving from the subscriber a selection to add a member to the subscriber's calling circle; and
   disallowing the subscriber to add the member to the subscriber's calling circle if a predefined limit on the maximum number of members in the calling circle has been reached.

2. The method of claim 1, further comprising:
   charging the subscriber a service fee in exchange for the discounted first rate.

3. The method of claim 2, wherein the service fee is a recurring fee for a predefined time period.

4. The method of claim 1, wherein the discounted first rate allows free telephone calls during predefined time periods.

5. The method of claim 1, further comprising:
   receiving from the subscriber a selection to remove a member from the subscriber's calling circle.

6. The method of claim 1, further comprising:
   disallowing the subscriber to add the member to the subscriber's calling circle if a predefined limit on the subscriber's changing of the calling circle has been reached.

7. The method of claim 1, further comprising:
   charging the subscriber a calling circle change fee if a predefined limit on the subscriber's changing of the calling circle has been reached.

8. The method of claim 1, wherein at least one of the subscriber's selections is received via a web portal.

9. The method of claim 1, wherein the subscriber's telephone service provider is a wireless telephone service provider.

10. A method for providing a discounted calling circle for a subscriber of a telephone service provider, the method comprising:

receiving selections for members of the subscriber's calling circle, where one or more members of the calling circle have a telephone service provider other than the subscriber's telephone service provider;

facilitating communications between the subscriber and members of the calling circle;

a step for providing a discounted calling rate to the subscriber for communications with members of the calling circle; and disallowing the subscriber to add more than a maximum number of members to the calling circle.

11. The method of claim 10, further comprising:

charging the subscriber a service fee in exchange for the discounted calling rate.

12. The method of claim 10, further comprising:

receiving a selection from the subscriber to changes the members of the subscriber's calling circle.

13. The method of claim 12, further comprising:

charging the subscriber a calling circle change fee if a predefined limit on changes has been reached.

14. A telephone services system allowing subscribers of a telephone service provider to define a calling circle for discounted telephone calls, the system comprising:

a telephone network interface for allowing the subscribers of the telephone service provider to make telephone calls with each other and with subscribers of other telephone service providers;

a subscriber database that stores account information for the subscribers of the telephone service provider, the account information for each of at least some of the subscribers comprising an identification of members of the subscriber's calling circle, where one or more members of the subscriber's calling circle have a telephone service provider other than the subscriber's telephone service provider; and a billing maintenance system configured to update the subscribers' account information based on the subscribers' usage of telephone services, to charge the subscribers a first rate for calls with members of the subscribers' calling circle and a second rate for calls with persons outside the subscribers' calling circles, the first rate being discounted with respect to the second rate, to receive selections from the subscribers to change the members of the subscribers' calling circles, and to disallow each subscriber from adding a member to the subscriber's calling circle if a predefined limit on the maximum number of members in the subscriber's calling circle has been reached.

15. The system of claim 14, wherein the billing maintenance system is configured to charge the subscribers a service fee in exchange for the discounted first rate.

16. The system of claim 14, wherein the discounted first rate allows free telephone calls during predefined time periods.

17. The system of claim 14, wherein the billing maintenance system is configured to disallow each subscriber from adding a member to the subscriber's calling circle if a predefined limit on the subscriber's changing of the calling circle has been reached.

18. The system of claim 14, wherein the billing maintenance system is configured to charge each subscriber a calling circle change fee for changing the members of the subscriber's calling circles if a predefined limit on the subscriber's changing of the calling circle has been reached.

19. The system of claim 14, further comprising:

a web server for receiving selections from the subscribers to change the members of the subscribers' calling circles via a web portal, the web server coupled to the billing maintenance system.

20. A method for providing telephone services to a subscriber by the subscriber's telephone service provider, the method comprising:

receiving from a subscriber a selection of one or more telephone numbers for members of a calling circle, at least one of the telephone numbers associated with a telephone service provider other than the subscriber's telephone service provider;

tracking calling activity by the subscriber, the calling activity including telephone calls between the subscriber and one or more phone numbers of the members of the calling circle;

charging the subscriber a first rate for calls between phone numbers of members of the calling circle and a second rate for calls between phone numbers of persons outside the calling circle, the first rate being discounted with respect to the second rate;

receiving from the subscriber a selection to add a member to the subscriber's calling circle; and disallowing the subscriber to add the member to the subscriber's calling circle if a predefined limit on the subscriber's changing of the calling circle has been reached.

21. A method for providing telephone services to a subscriber by the subscriber's telephone service provider, the method comprising:

receiving from a subscriber a selection of one or more telephone numbers for members of a calling circle, at least one of the telephone numbers associated with a telephone service provider other than the subscriber's telephone service provider;

tracking calling activity by the subscriber, the calling activity including telephone calls between the subscriber and one or more phone numbers of the members of the calling circle;

charging the subscriber a first rate for calls between phone numbers of members of the calling circle and a second rate for calls between phone numbers of persons outside the calling circle, the first rate being discounted with respect to the second rate;

receiving from the subscriber a selection to add a member to the subscriber's calling circle; and charging the subscriber a calling circle change fee if a predefined limit on the subscriber's changing of the calling circle has been reached.

* * * * *